US010000123B2

(12) United States Patent
Hori et al.

(10) Patent No.: US 10,000,123 B2
(45) Date of Patent: Jun. 19, 2018

(54) HYBRID VEHICLE

(71) Applicant: Toyota Jidosha Kabushiki Kaisha, Toyota-shi, Aichi-ken (JP)

(72) Inventors: Takaharu Hori, Anjo (JP); Hiromitsu Kawamori, Toyota (JP); Shinichiro Minegishi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days. days.

(21) Appl. No.: 15/459,771

(22) Filed: Mar. 15, 2017

(65) Prior Publication Data
US 2017/0267102 A1    Sep. 21, 2017

(30) Foreign Application Priority Data

Mar. 18, 2016 (JP) ................................. 2016-055332

(51) Int. Cl.
| | |
|---|---|
| *B60L 3/04* | (2006.01) |
| *B60W 20/50* | (2016.01) |
| *B60L 3/00* | (2006.01) |
| *B60K 6/26* | (2007.10) |
| *B60L 11/14* | (2006.01) |

(52) U.S. Cl.
CPC ............. *B60L 3/0046* (2013.01); *B60K 6/26* (2013.01); *B60L 3/003* (2013.01); *B60L 3/04* (2013.01); *B60L 11/14* (2013.01); *B60K 2006/268* (2013.01); *B60L 2210/14* (2013.01); *B60L 2240/44* (2013.01); *B60L 2240/547* (2013.01)

(58) Field of Classification Search
CPC combination set(s) only.
See application file for complete search history.

(56) References Cited

U.S. PATENT DOCUMENTS

| 2011/0307136 | A1* | 12/2011 | Komata | ................ B60K 6/365 701/22 |
| 2014/0327424 | A1* | 11/2014 | Masuda | ................ B60L 1/006 323/318 |
| 2015/0258897 | A1* | 9/2015 | Okada | ...................... B60L 7/14 318/376 |

FOREIGN PATENT DOCUMENTS

| JP | 2007-255294 A | 10/2007 |
| JP | 2008-279978 A | 11/2008 |
| JP | 2010-119217 A | 5/2010 |
| JP | 2010-247725 A | 11/2010 |
| JP | 2014-024452 A | 2/2014 |

* cited by examiner

*Primary Examiner* — Bryan A Evans
(74) *Attorney, Agent, or Firm* — Dinsmore & Shohl LLP

(57) ABSTRACT

When such an abnormality that a battery voltage system voltage is brought into an overvoltage state during regenerative control of a motor occurs, a booster converter is shut down, a system main relay is brought into a non-arc state and turned off. Then, an engine is started when an operation of the engine is stopped. The booster converter is used to determine turning-off of the system main relay, and a battery-less travel is started thereafter. In this way, inconvenience that possibly occurs by starting the battery-less travel at a time when abnormality of the system main relay being stuck to be on occurs can be avoided.

4 Claims, 3 Drawing Sheets

HYBRID VEHICLE

CROSS-REFERENCE TO RELATED APPLICATIONS

This application claims priority to Japanese Patent Application No. 2016-055332 filed on Mar. 18, 2016, which is incorporated herein by reference in its entirety including the specification, drawings and abstract.

BACKGROUND

1. Technical Field

The present disclosure relates to a hybrid vehicle and, in particular, to a hybrid vehicle including a booster converter that boosts electric power from a battery and supplies the boosted electric power to a drive circuit that drives a traveling motor.

2. Description of Related Art

As a hybrid vehicle, a hybrid vehicle that includes a booster converter and a system main relay in an electric power line between a battery and an inverter that drives a traveling motor has been proposed, the booster converter boosts electric power on the battery side and supplies the boosted electric power to the inverter side, and the system main relay connects or disconnects the battery (for example, see Japanese Patent Application Publication No. 2007-255294 (JP 2007-255294 A)). When battery-related failure is detected in this hybrid vehicle, the system main relay is turned off to disconnect the battery, an engine is started thereafter, and the hybrid vehicle travels without charging or discharging of the battery.

SUMMARY

When such an abnormality that a voltage on the battery side with respect to the booster converter is brought into an overvoltage state occurs in the above-described hybrid vehicle during regenerative control of the traveling motor, the booster converter is shut down to inhibit the voltage on the battery side from further becoming the overvoltage. Then, as described above, the system main relay is turned off, the engine is started, and the hybrid vehicle is controlled to travel without charging or discharging of the battery. However, when the system main relay is stuck to be on, the battery is charged or discharged by unexpected electric power, and this possibly results in breakdown of the failed battery. Thus, it is necessary to check that the system main relay is turned off. However, because the booster converter is shut down, turning-off of the system main relay cannot be checked by driving the booster converter. As a result, the hybrid vehicle cannot travel in a limp home mode in which the hybrid vehicle travels without charging or discharging of the battery.

The present disclosure provides a hybrid vehicle that checks turning-off of a system main relay and can travel without charging or discharging of a battery when such an abnormality that a voltage on the battery side with respect to a booster converter is brought into an overvoltage state occurs during regenerative control of a traveling motor.

A hybrid vehicle of the present disclosure includes an engine, a generator, a motor, a drive circuit, a battery, a low-voltage electric power line, a high-voltage electric power line, a booster converter, a system main relay, and at least one electronic control unit. The generator can crank the engine, and the generator is configured to generate electric power by using power from the engine. The motor is configured to input and output the power to a driveshaft that is coupled to an axle. The drive circuit is configured to drive the generator and the motor. The low-voltage electric power line is provided on the battery side. The high-voltage electric power line is provided on the drive circuit side. The booster converter is connected to the low-voltage electric power line and the high-voltage electric power line and is configured to boost the electric power on the low-voltage electric power line side and supply the boosted electric power to the high-voltage electric power line side. The system main relay is configured to connect the battery to the low-voltage electric power line and release the connection when being turned on or off. The at least one electronic control unit is configured to control the engine, the generator, the motor, and the booster converter such that the hybrid vehicle travels while outputting requested torque that corresponds to a request by a driver. When such an abnormality that a voltage of the low-voltage electric power line is brought into an overvoltage state during regenerative drive of the motor occurs, the at least one electronic control unit is configured to i) shut down the booster converter, turn off the system main relay, bring the engine into a driven state, and determine that on-failure of the system main relay does not occur by using the booster converter and ii) control the hybrid vehicle thereafter such that the hybrid vehicle travels by using the power from the engine.

In the hybrid vehicle of the present disclosure, when such an abnormality that the voltage of the low-voltage electric power line on the battery side is brought into the overvoltage state during the regenerative drive of the motor that can input/output the power to the driveshaft coupled to the axle occurs, the booster converter is shut down, the system main relay is turned off, and the engine is brought into the driven state. Because the system main relay is off in this state, the booster converter can be driven. Accordingly, it is determined that the on-failure of the system main relay does not occur by using the booster converter. Thereafter, the hybrid vehicle is controlled to travel by using the power from the engine. Just as described, after the booster converter is shut down once, the system main relay is turned off, and the engine is brought into the driven state, the booster converter is brought into a state where driving thereof is allowed. Thus, the booster converter can be used to check that the on-failure of the system main relay does not occur. In this way, inconvenience that possibly occurs by executing such control that the hybrid vehicle travels without charging or discharging of the battery at the time when such an abnormality that the system main relay is stuck to be on occurs can be avoided. In other words, even when such an abnormality that a voltage on the battery side with respect to the booster converter is brought into the overvoltage state during the regenerative control of a traveling motor occurs, turning-off of the system main relay is checked, and the hybrid vehicle can thereby travel (in a limp home mode) without charging or discharging of the battery.

In such a hybrid vehicle of the present disclosure, the at least one electronic control unit may be configured to bring the system main relay into a state where a current does not flow through the system main relay and then turn off the system main relay when the at least one electronic control unit turns off the system main relay due to occurrence of the abnormality. In this way, sticking of the system main relay to be on, which possibly occurs by turning on the system main relay while the current flows therethrough, can be inhibited.

In the hybrid vehicle of the present disclosure, when the abnormality occurs during cranking of the engine and the booster converter is shut down, the at least one electronic control unit may be configured to i) stop output of torque from the generator and ii) turn off the system main relay, start the engine, and bring the engine into the driven state. The engine is cranked by using the torque from the generator. Thus, it is preferred to once set the output of the torque from the generator to have a value 0 and thereby facilitate adjustment of a voltage of the high-voltage electric power line.

In the hybrid vehicle of the present disclosure, when the at least one electronic control unit shuts down the booster converter and brings the engine into the driven state due to the occurrence of the abnormality, the at least one electronic control unit may be configured to remove the overvoltage state of the low-voltage electric power line by lowering the voltage of the high-voltage electric power line and then determine by the booster converter that the on-failure of the system main relay does not occur. In this way, the overvoltage state of the low-voltage electric power line can be removed in an early stage.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Next, a description will be made on a mode for carrying out the present disclosure by using an example.

Figure 1:
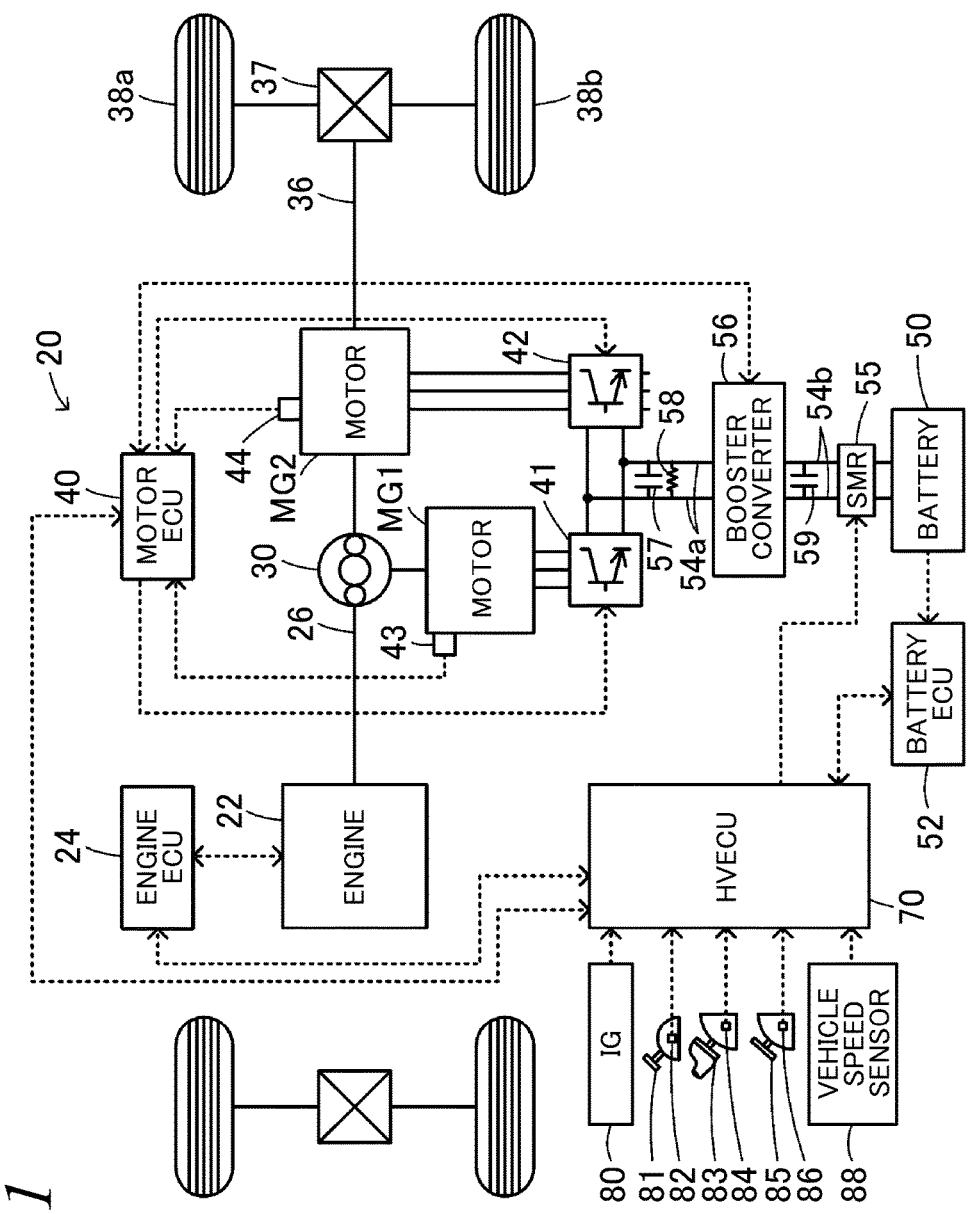
FIG. 1 is a configuration diagram that schematically shows a configuration of a hybrid vehicle 20 as one example of the present disclosure.

FIG. 1 is a configuration diagram that schematically shows a configuration of a hybrid vehicle 20 as one example of the present disclosure. As shown in the drawing, the hybrid vehicle 20 in the example includes an engine 22, an engine electronic control unit (hereinafter referred to as an engine ECU) 24, a planetary gear 30, a motor MG1, a motor MG2, inverters 41, 42, a motor electronic control unit (hereinafter referred to as a motor ECU) 40, a battery 50, a battery electronic control unit (hereinafter referred to as a battery ECU) 52, a booster converter 56, and a hybrid electronic control unit (hereinafter referred to as an HVECU) 70.

The engine 22 is configured as an internal combustion engine that outputs power by using general gasoline, diesel fuel, or the like as fuel, and driving thereof is controlled by the engine ECU 24. Although not shown, the engine ECU 24 is configured as a microprocessor that has a CPU as a central component, and includes a ROM that stores a processing program, a RAM that temporarily stores data, input/output ports, and a communication port in addition to the CPU. The engine ECU 24 receives signals from various sensors that detect an operation state of the engine 22, for example, a crank position $\theta cr$ from a crank position sensor that detects a rotational position of a crankshaft 26, a coolant temperature Twe from a coolant temperature sensor that detects a temperature of a coolant for the engine 22, an intake air amount Qa from an airflow meter that is attached to an intake pipe, an intake air temperature Ta from a temperature sensor that is attached to the intake pipe, and the like through the input port. The engine ECU 24 outputs various control signals for driving the engine 22, for example, a drive signal to a fuel injection valve, a drive signal to a throttle motor that adjusts a position of a throttle valve, a control signal to an ignition coil that is integrated with an igniter, and the like through the output port. In addition, the engine ECU 24 communicates with the HVECU 70, controls an operation of the engine 22 on the basis of a control signal from the HVECU 70, and outputs data on the operation state of the engine 22 to the HVECU 70 when necessary. Note that the engine ECU 24 also computes a rotational speed of the crankshaft 26, that is, a speed Ne of the engine 22 on the basis of the signal from the crank position sensor, which is not shown and is attached to the crankshaft 26.

The planetary gear 30 is configured as a single pinion planetary gear mechanism. A rotor of the motor MG1, a driveshaft 36 that is coupled to drive wheels 38a, 38b via a differential gear 37, and the crankshaft 26 of the engine 22 are respectively connected to a sun gear, a ring gear, and a carrier of the planetary gear 30.

Figure 2:
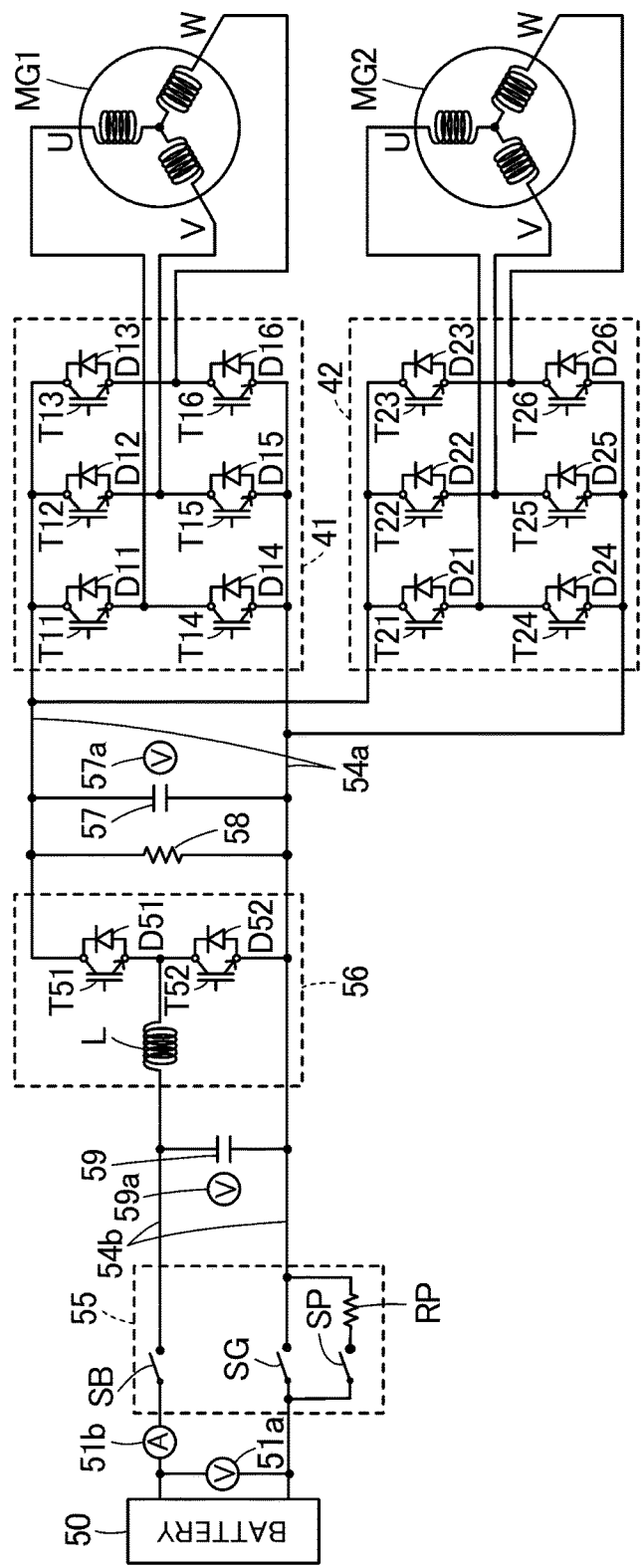
FIG. 2 is a configuration diagram that schematically shows a configuration of an electric power system including motors MG1, MG2.

The motor MG1 is configured as a well-known synchronous generator motor including: the rotor in which a permanent magnet is embedded; and a stator around which a three-phase coil is wound. As described above, the rotor thereof is connected to the sun gear of the planetary gear 30. The motor MG2 is configured as a synchronous generator motor like the motor MG1, and a rotor thereof is connected to the driveshaft 36. The motors MG1, MG2 are driven when the inverters 41, 42 are controlled by the motor ECU 40. The inverters 41, 42 are connected to the booster converter 56 by an electric power line (hereinafter referred to as a drive voltage system electric power line) 54a, and the booster converter 56 is connected to an electric power line (hereinafter referred to as a battery voltage system electric power line) 54b, to which the battery 50 and a system main relay 55 are connected. As shown in FIG. 2, the inverters 41, 42 are respectively constructed of six transistors T11 to T16, T21 to T26 and six diodes D11 to D16, D21 to D26 that are respectively connected, in parallel in reverse directions, to the transistors T11 to T16, T21 to T26. The transistors T11 to T16, T21 to T26 are arranged such that each pair is located on as a source side and a sink side on a positive-electrode bus and a negative-electrode bus of the drive voltage system electric power line 54a, and each of the three-phase coils (a U-phase, a V-phase, and a W-phase) of the motors MG1, MG2 is connected to a connection point between each pair of the transistors. Accordingly, a rotation magnetic field can be generated in each of the three-phase coils by adjusting a ratio of on-time of the paired transistors T11 to T16, T21 to T26 in a state where a voltage is applied to each of the inverters 41, 42. Thus, the motors MG1, MG2 can be rotationally driven. Because the inverters 41, 42 share the positive-electrode bus and the negative-electrode bus of the drive voltage system electric power line 54a, electric power that is generated by either one of the motors MG1, MG2 can be supplied to the other motor.

As shown in FIG. 2, the booster converter 56 is configured as a booster converter that includes two transistors T51, T52, two diodes D51, D52 that are connected, in parallel in reverse directions, to the transistors T51, T52, and a reactor L. Each of the two transistors T51, T52 is connected to the positive-electrode bus of the drive voltage system electric power line 54a and the negative-electrode buses of the drive voltage system electric power line 54a and the battery voltage system electric power line 54b, and the reactor L is connected to a connection point of the transistors T51, T52 and a positive-electrode bus of the battery voltage system electric power line 54b. Accordingly, by turning on or off the transistors T51, T52, electric power of the battery voltage system electric power line 54b can be boosted and supplied to the drive voltage system electric power line 54a, and a voltage of electric power of the drive voltage system electric power line 54a can be lowered to supply the electric power to the battery voltage system electric power line 54b.

A smoothing capacitor 57 for smoothing and a discharge resistor 58 for discharging are connected in parallel to the drive voltage system electric power line 54a. In addition, the system main relay 55 that includes a positive-electrode side relay SB, a negative-electrode side relay SG, a pre-charge relay SP, and a pre-charge resistor RP is attached to an output terminal side of the battery 50 in the battery voltage system electric power line 54b. Furthermore, a smoothing filter capacitor 59 is connected to the booster converter 56 side of the battery voltage system electric power line 54b.

Although not shown, the motor ECU 40 is configured as a microprocessor that has a CPU as a central component, and includes a ROM that stores a processing program, a RAM that temporarily stores data, input/output ports, and a communication port in addition to the CPU. The motor ECU 40 receives signals that are required to control driving of the motors MG1, MG2, for example, rotation positions θm1, θm2 from rotation position detection sensors 43, 44 that respectively detect rotation positions of the rotors of the motors MG1, MG2, phase currents that are applied to the motors MG1, MG2 and are detected by a current sensor, which is not shown, and the like through the input port. The motor ECU 40 also receives a voltage (the voltage of the drive voltage system electric power line 54a, hereinafter referred to as a drive voltage system voltage) VH of the smoothing capacitor 57 from a voltage sensor 57a that is attached between terminals of the smoothing capacitor 57, a voltage (the voltage of the battery voltage system electric power line 54b, hereinafter referred to as a battery voltage system voltage) VL of the filter capacitor 59 from a voltage sensor 59a that is attached between terminals of the filter capacitor 59, and the like. The motor ECU 40 outputs control signals for driving the inverters 41, 42 and the booster converter 56, for example, a switching control signal to the transistors T11 to T16, T21 to T26 of the inverters 41, 42, a switching control signal to the transistors T51, T52 of the booster converter 56, and the like through the output port. In addition, the motor ECU 40 communicates with the HVECU 70, controls driving of the motors MG1, MG2 on the basis of a control signal from the HVECU 70, and outputs data on operation states of the motors MG1, MG2 to the HVECU 70 when necessary. Note that the motor ECU 40 also computes rotational speeds Nm1, Nm2 of the motors MG1, MG2 on the basis of the rotation positions θm1, θm2 of the rotors of the motors MG1, MG2 from the rotation position detection sensors 43, 44.

The battery 50 is configured as a lithium-ion secondary battery, for example, and exchanges the electric power with the motors MG1, MG2 via the inverters 41, 42. Although not shown, a battery ECU 52 that manages the battery 50 is configured as a microprocessor that has a CPU as a central component, and includes a ROM that stores a processing program, a RAM that temporarily stores data, input/output ports, and a communication port in addition to the CPU. The battery ECU 52 receives signals that are required to manage the battery 50, for example, a battery voltage Vb from a voltage sensor 51a that is mounted between terminals of the battery 50, a battery current Ib from a current sensor 51b that is attached to the electric power line connected to the output terminal of the battery 50, a battery temperature Tb from a temperature sensor, which is not shown and is attached to the battery 50, and the like through the input port. In addition, the battery ECU 52 communicates with the HVECU 70 and transmits data on a state of the battery 50 to the HVECU 70 through communication when necessary. In order to manage the battery 50, the battery ECU 52 computes a state of charge SOC as a ratio of capacity of the electric power that can be discharged from the battery 50 at the time to full capacity on the basis of an integral value of the charging/discharging current Ib that is detected by the current sensor, and computes input/output limits Win, Wout as maximum allowable electric power that may be charged/discharged to/from the battery 50 on the basis of the computed state of charge SOC and the battery temperature Tb.

Although not shown, the HVECU 70 is configured as a microprocessor that has a CPU as a central component, and includes a ROM that stores a processing program, a RAM that temporarily stores data, input/output ports, and a communication port in addition to the CPU. The HVECU 70 receives various signals that are required to control driving and the like, for example, an ignition signal from an ignition switch 80, a vehicle speed V from a vehicle speed sensor 88, and the like through the input port. In addition, the HVECU 70 receives a shift position SP from a shift position sensor 82 that detects an operation position of a shift lever 81, an accelerator operation amount Acc from an accelerator pedal position sensor 84 that detects a depression amount of an accelerator pedal 83, a brake pedal position BP from a brake pedal position sensor 86 that detects a depression amount of a brake pedal 85, and the like. The HVECU 70 outputs control signals, such as a drive signal to the system main relay 55, through the output port. As described above, the HVECU 70 is connected to the engine ECU 24, the motor ECU 40, and the battery ECU 52 via the communication port and exchanges the various control signals and the data with the engine ECU 24, the motor ECU 40, and the battery ECU 52.

Figure 3:
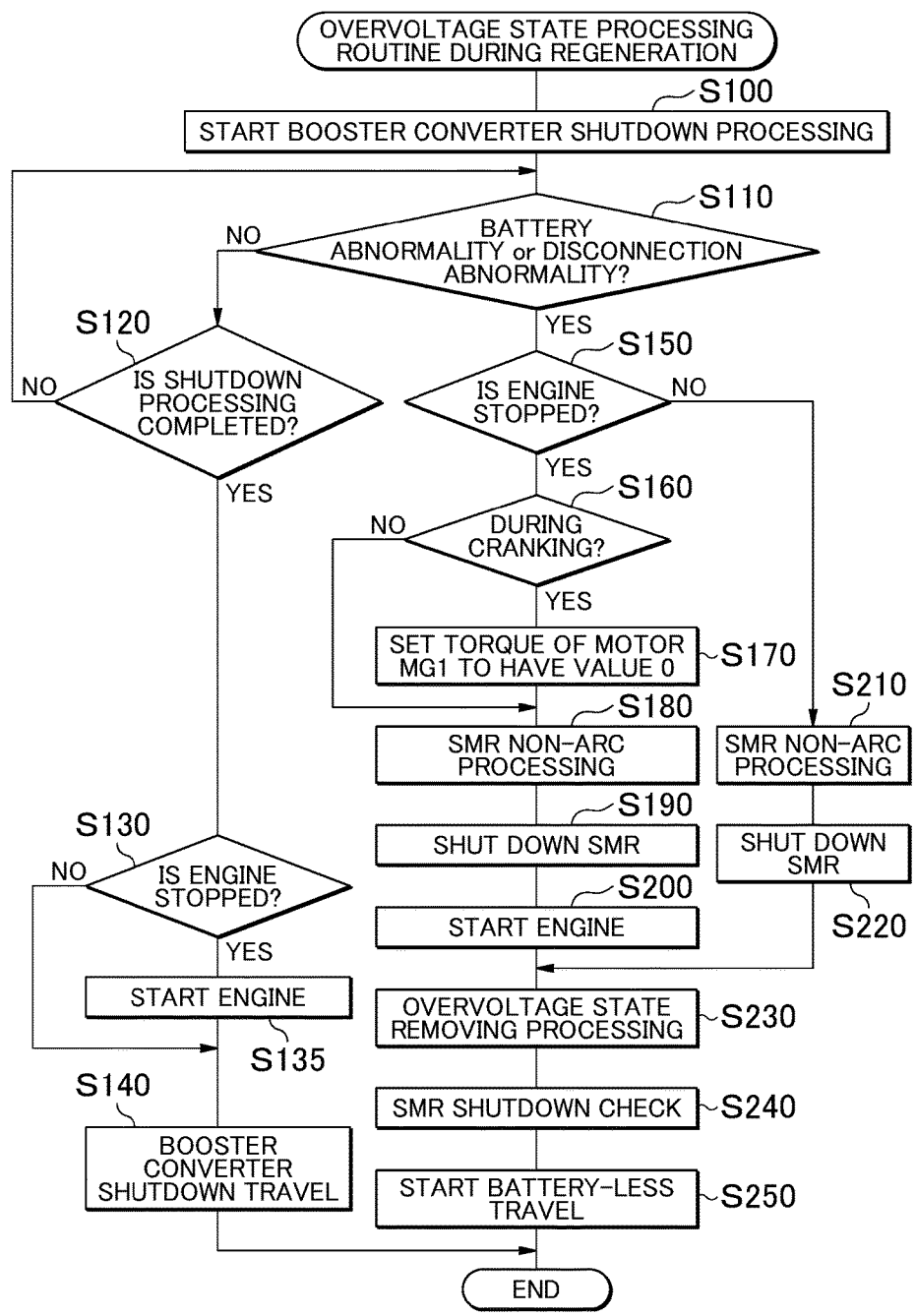
FIG. 3 is a flowchart that shows one example of an overvoltage state processing routine during regeneration executed by an HVECU 70.

A description will be made on an operation of the hybrid vehicle 20 in the example that is configured as described above, in particular, on the operation thereof at a time when such an abnormality that the battery voltage system voltage VL is brought into an overvoltage state occurs during regenerative control of the motor MG2. As a time during the regenerative control of the motor MG2, a time when the hybrid vehicle 20 travels while a braking force is applied thereto with the accelerator pedal being released on a downhill and a time when the hybrid vehicle 20 travels while the braking force is applied thereto by depression of the brake pedal 85 by a driver can be assumed. Such an abnormality that the battery voltage system voltage VL is brought into the overvoltage state is detected when the battery voltage system voltage VL exceeds a threshold that is defined in advance as a higher voltage than the voltage Vb of the battery 50. FIG. 3 is a flowchart that shows one example of an overvoltage state processing routine during regeneration that is executed by the HVECU 70 at a time when the battery voltage system voltage VL is brought into the overvoltage state during the regenerative control of the motor MG2.

Once the overvoltage state processing routine during the regeneration is executed, the HVECU 70 first starts shutdown processing of the booster converter 56 (step S100). In the example, this shutdown processing is processing of shutting down the booster converter 56 and stabilizing the drive voltage system voltage VH at a target voltage VH* by drive control of the motors MG1, MG2. This processing is performed to inhibit a further increase in the battery voltage system voltage VL, which is caused by shutdown of the booster converter 56. The drive voltage system voltage VH is stabilized at the target voltage VH* by the drive control of the motors MG1, MG2, so as to facilitate control thereafter. The booster converter 56 can be shut down by performing gate shutdown (turning-off) of the two transistors T51, T52. Note that the braking force that is applied to the vehicle by the motor MG2 can be replaced with a braking force by a hydraulic brake, which is not shown, and can thereby be continuously applied to the vehicle.

Next, it is determined whether such an abnormality that the battery voltage system voltage VL is brought into the overvoltage state is an abnormality caused by the battery 50 or an abnormality caused by disconnection of the battery voltage system electric power line 54b (step S110). The determination on whether such an abnormality that the battery voltage system voltage VL is brought into the overvoltage state is the abnormality caused by the battery 50 or the abnormality caused by the disconnection of the battery voltage system electric power line 54b is made by an abnormality determination processing routine that differs from this routine. Thus, in step S110, processing is performed to check whether a result determined by the abnormality determination processing routine is the abnormality caused by the battery 50 or the abnormality caused by the disconnection of the battery voltage system electric power line 54b. Note that, while the determination on a type of the abnormality that causes such an abnormality that the battery voltage system voltage VL is brought into the overvoltage state is being made by the abnormality determination processing routine, the result cannot be determined and thus a negative determination is made in step S110.

If it cannot be determined whether such an abnormality that the battery voltage system voltage VL is brought into the overvoltage state is the abnormality caused by the battery 50 or the abnormality caused by the disconnection of the battery voltage system electric power line 54b, the processing is paused for the result until the shutdown processing of the booster converter 56, which is started in step S100, is completed (steps S110, S120). If it cannot be determined whether such an abnormality that the battery voltage system voltage VL is brought into the overvoltage state is the abnormality caused by the battery 50 or the abnormality caused by the disconnection of the battery voltage system electric power line 54b until the shutdown processing of the booster converter 56 is completed, the engine 22 is started if the operation of the engine 22 is stopped (S130, S135), a booster converter shutdown travel is started (step S140), and this routine is terminated. The booster converter shutdown travel can be performed by controlling the engine 22, the motor MG1, and the motor MG2 such that a shutdown state of the booster converter 56 is maintained, requested power that is requested by the driver is output from the engine 22 and the motor MG2 completely consumes the electric power that is generated by the motor MG1 by using some of the power from the engine 22. More specifically, the booster converter shutdown travel is performed as follows by maintaining the shutdown state of the booster converter 56. First, the HVECU 70 sets a target speed Ne* of the engine 22, at which the requested power is efficiently output from the engine 22, and transmits the target speed Ne* to the engine ECU 24. The HVECU 70 also sets a torque command Tm1* of the motor MG1 such that the engine 22 is operated at the target speed Ne*, sets a torque command Tm2* of the motor MG2 such that the requested power is output to the driveshaft 36, and transmits the torque command Tm1* and the torque command Tm2* to the motor ECU 40. The engine ECU 24 that has received the target speed Ne* executes fuel injection control and ignition control such that the engine 22 is operated at the target speed Ne*. The motor ECU 40 that has received the torque commands Tm1*, Tm2* executes switching control of the transistors T11 to T16, T21 to T26 such that torque corresponding to the torque commands Tm1*, Tm2* is output from the motors MG1, MG2. In the booster converter shutdown travel, just as described, the electric power that is generated by the motor MG1 is completely consumed by the motor MG2. Thus, the battery 50 is neither charged nor discharged.

If it is determined in step S110 whether such an abnormality that the battery voltage system voltage VL is brought into the overvoltage state is the abnormality caused by the battery 50 or the abnormality caused by the disconnection of the battery voltage system electric power line 54b, it is determined whether the engine 22 is currently operated or currently stopped (step S150).

If the operation of the engine 22 is currently stopped, it is determined whether the engine 22 is currently cranked (step S160). This determination can be made by making a determination on whether cranking torque is output from the motor MG1. If the engine 22 is currently cranked, the torque command Tm1* of the motor MG1 is set to have a value 0, and output torque of the motor MG1 is set to have the value 0 (step S170), so as to bring the engine 22 into a state of not being cranked. If it is determined in step S160 that the engine 22 is not currently cranked, or if the engine 22 is brought into the state of not being cranked in step S170, the system main relay 55 is brought into a non-arc state (step S180), and the system main relay 55 is turned off (shut down) (step S190). Here, the non-arc state of the system main relay 55 means a state where a current does not flow through the system main relay 55. The system main relay 55 is turned off (shut down) after being brought into the non-arc state, just as described. A reason therefor is to prevent occurrence of an abnormality that is caused by sticking of the system main relay 55 to be on. Then, the engine 22 is started (step S200). The engine 22 can be started by executing the drive control of the motor MG1 such that the cranking torque is output from the motor MG1 and by executing the drive control of the motor MG2 such that the electric power (the generated electric power or the consumed electric power) of the motor MG1 can be canceled by the electric power (the consumed electric power or the generated electric power) of the motor MG2.

Once the engine 22 is started, just as described, overvoltage state removing processing of the battery voltage system voltage VL is executed (step S230). The overvoltage state removing processing can be performed by lowering the target voltage VH* of the drive voltage system voltage VH to a normal voltage of the battery voltage system voltage VL (approximately the voltage Vb of the battery 50, for example) and by controlling the drive voltage system voltage VH to become the target voltage VH* by the drive control of the motor MG1 and the motor MG2. By such control, the voltage VL of the smoothing filter capacitor 59, which is attached to the battery voltage system electric power line 54b, is lowered to the normal voltage, and the overvoltage state is thereby removed.

Once the overvoltage state of the battery voltage system voltage VL is removed, turning-off (shutdown) of the system main relay 55 is checked (step S240), a battery-less travel is started (step S250), and this routine is then terminated. Turning-off (shutdown) of the system main relay 55 can be checked by determining whether the system main relay 55 is stuck to be on by executing drive control of the booster converter 56 so as to change the battery voltage system voltage VL. The battery-less travel can be performed by controlling the engine 22, the motor MG1, and the motor MG2 such that the requested power requested by the driver is output from the engine 22 and the motor MG2 completely consumes the electric power that is generated by the motor MG1 by using some of the power from the engine 22. More specifically, the battery-less travel is performed as follows. First, the HVECU 70 sets the target speed Ne* of the engine 22, at which the requested power is efficiently output from the engine 22, and transmits the target speed Ne* to the engine ECU 24. The HVECU 70 also sets the torque command Tm1* of the motor MG1 such that the engine 22 is operated at the target speed Ne*, sets the torque command Tm2* of the motor MG2 such that the requested power is output to the driveshaft 36, and transmits the torque command Tm1* and the torque command Tm2* to the motor ECU 40. The engine ECU 24 that has received the target speed Ne* executes the fuel injection control and the ignition control such that the engine 22 is operated at the target speed Ne*. The motor ECU 40 that has received the torque commands Tm1*, Tm2* executes the switching control of the transistors T11 to T16, T21 to T26 such that the torque corresponding to the torque commands Tm1*, Tm2* is output from the motors MG1, MG2. In the battery-less travel, just as described, the electric power that is generated by the motor MG1 is completely consumed by the motor MG2. Thus, the battery 50 is neither charged nor discharged. For this reason, such a travel is referred to as the battery-less travel regardless of the connection or disconnection of the battery 50 by the system main relay 55. In other words, the battery-less travel is a travel mode in which charging or discharging of the battery 50 is inhibited by completely consuming the electric power that is generated by the motor MG1 by the motor MG2.

If it is determined in step S150 that the engine 22 is currently operated, the system main relay 55 is brought into the non-arc state (step S210), and the system main relay 55 is turned off (shut down) (step S220). Then, the overvoltage state removing processing of the battery voltage system voltage VL is executed (step S230), turning-off (shutdown) of the system main relay 55 is checked (step S240), the battery-less travel is started (step S250), and this routine is then terminated.

In the hybrid vehicle 20 of the example that has been described so far, when such an abnormality that the battery voltage system voltage VL is brought into the overvoltage state occurs during the regenerative control of the motor MG2, it is determined whether such an abnormality that the battery voltage system voltage VL is brought into the overvoltage state is the abnormality caused by the battery 50 or the abnormality caused by the disconnection of the battery voltage system electric power line 54b. Once this determination is performed, the system main relay 55 is considered to be in the non-arc state, and the system main relay 55 is turned off (shut down). When the operation of the engine 22 is currently stopped, the engine 22 is started. Then, turning-off (shutdown) of the system main relay 55 is checked by using the booster converter 56. Thereafter, the battery-less travel is started. The battery-less travel is started after turning-off (shutdown) of the system main relay 55 is determined. Thus, inconvenience (for example, breakdown of the battery or the like) that possibly occurs by starting the battery-less travel at a time when the abnormality of the system main relay 55 being stuck to be on occurs can be avoided. Accordingly, even when such an abnormality that the battery voltage system voltage VL on the battery 50 side with respect to the booster converter 56 is brought into the overvoltage state occurs during the regenerative control of the motor MG2, turning-off of the system main relay 55 is checked, and the hybrid vehicle 20 can travel in a limp home mode. In addition, the overvoltage state of the battery voltage system voltage VL is removed by lowering the target voltage VH* of the drive voltage system voltage VH to the normal voltage of the battery voltage system voltage VL after turning off (shutting down) the system main relay 55 and thereby controlling the motor MG1 and the motor MG2. Thus, the overvoltage state of the battery voltage system voltage VL can be removed in an early stage. In the case where the engine 22 is being cranked at a time when such an abnormality that the battery voltage system voltage VL is brought into the overvoltage state occurs, the torque of the motor MG1 is set to have the value 0, and the engine 22 is brought into the state of not being cranked. Then, the system main relay 55 is turned off (shut down), and the engine 22 is started. In this way, the overvoltage state can appropriately be handled even when the engine 22 is being cranked.

The hybrid vehicle 20 of the example is configured by including: the planetary gear 30 that is connected to the engine 22, the motor MG1, and the driveshaft 36 coupled to an axle; the motor MG2 that inputs/outputs the power to the driveshaft 36; the booster converter 56 that boosts the electric power of the battery 50 and supplies the boosted electric power to the inverters 41, 42; and the system main relay 55 that is attached to the battery voltage system electric power line 54b between the battery 50 and the booster converter 56. However, the hybrid vehicle may have any type of the configuration as long as the hybrid vehicle includes: the engine; the generator that can generate the electric power by using the power from the engine; the motor that can input/output the power to the driveshaft; the booster converter that boosts the electric power from the battery and supplies the boosted electric power to the motor and the generator; and the system main relay that is attached to the electric power line between the battery and the booster converter. For example, the hybrid vehicle may be configured as a so-called series hybrid vehicle.

A description will be made on corresponding relationships between primary elements of the example and primary elements of the present disclosure described in the section "SUMMARY". In the example, the engine 22 is one example of the "engine", the motor MG1 is one example of the "generator", the motor MG2 is one example of the "motor", the inverters 41, 42 are one example of the "drive circuit", the battery voltage system electric power line 54b is one example of the "low-voltage electric power line that is provided on the battery side", the drive voltage system electric power line 54a is one example of the "high-voltage electric power line that is provided on the drive circuit side", the booster converter 56 is one example of the "booster converter", the system main relay 55 is one example of the "system main relay", and the HVECU 70, the engine ECU 24, and the motor ECU 40 that execute the overvoltage state processing routine during the regeneration in FIG. 3 are one example of the "at least one electronic control unit".

Note that, because the example is merely one example for specifically describing the mode for carrying out the present disclosure described in the section "SUMMARY", the corresponding relationships between the primary elements of the example and the primary elements of the present disclosure described in the section "SUMMARY" do not limit the elements of the present disclosure described in the section "SUMMARY". In other words, the present disclosure described in the section "SUMMARY" should be interpreted on the basis of the description therein, and the example is merely the specific example of the present disclosure described in the section "SUMMARY".

The mode for carrying out the present disclosure has been described so far by using the example. However, the present disclosure is not limited to such an example in any respect, and it is needless to say that the present disclosure can be implemented in various modes within the scope that does not depart from the gist of the present disclosure.

The present disclosure can be used in hybrid vehicle manufacturing industry or the like.

What is claimed is:

1. A hybrid vehicle comprising:
an engine;
a generator capable of cranking the engine, the generator configured to generate electric power by using power from the engine;
a motor configured to input and output the power to a driveshaft that is coupled to an axle;
a drive circuit configured to drive the generator and the motor;
a battery;
a low-voltage electric power line provided on the battery side;
a high-voltage electric power line provided on the drive circuit side;
a booster converter connected to the low-voltage electric power line and the high-voltage electric power line, the booster converter configured to boost the electric power on the low-voltage electric power line side and supply a boosted electric power to the high-voltage electric power line side;
a system main relay configured to connect the battery to the low-voltage electric power line and release the connection when the system main relay is turned on or off; and
at least one electronic control unit configured to control the engine, the generator, the motor, and the booster converter such that the hybrid vehicle travels while outputting requested torque that corresponds to a request by a driver, wherein
when such an abnormality that a voltage of the low-voltage electric power line is brought into an overvoltage state during regenerative drive of the motor occurs, the at least one electronic control unit is configured to
i) shut down the booster converter, turn off the system main relay, bring the engine into a driven state, and determine by using the booster converter that on-failure of the system main relay does not occur, and
ii) control the hybrid vehicle thereafter such that the hybrid vehicle travels by using the power from the engine.

2. The hybrid vehicle according to claim 1, wherein the at least one electronic control unit is configured to bring the system main relay into a state where a current does not flow through the system main relay and then turn off the system main relay when the at least one electronic control unit turns off the system main relay due to occurrence of the abnormality.

3. The hybrid vehicle according to claim 1, wherein when the abnormality occurs during cranking of the engine and the booster converter is shut down, the at least one electronic control unit is configured to i) stop output of the torque from the generator and ii) turn off the system main relay, start the engine, and bring the engine into the driven state.

4. The hybrid vehicle according to claim 1, wherein when the at least one electronic control unit shuts down the booster converter and brings the engine into the driven state due to an occurrence of the abnormality, the at least one electronic control unit is configured to remove the overvoltage state of the low-voltage electric power line by lowering a voltage of the high-voltage electric power line and then determine by using the booster converter that the on-failure of the system main relay does not occur.

* * * * *